UNITED STATES PATENT OFFICE.

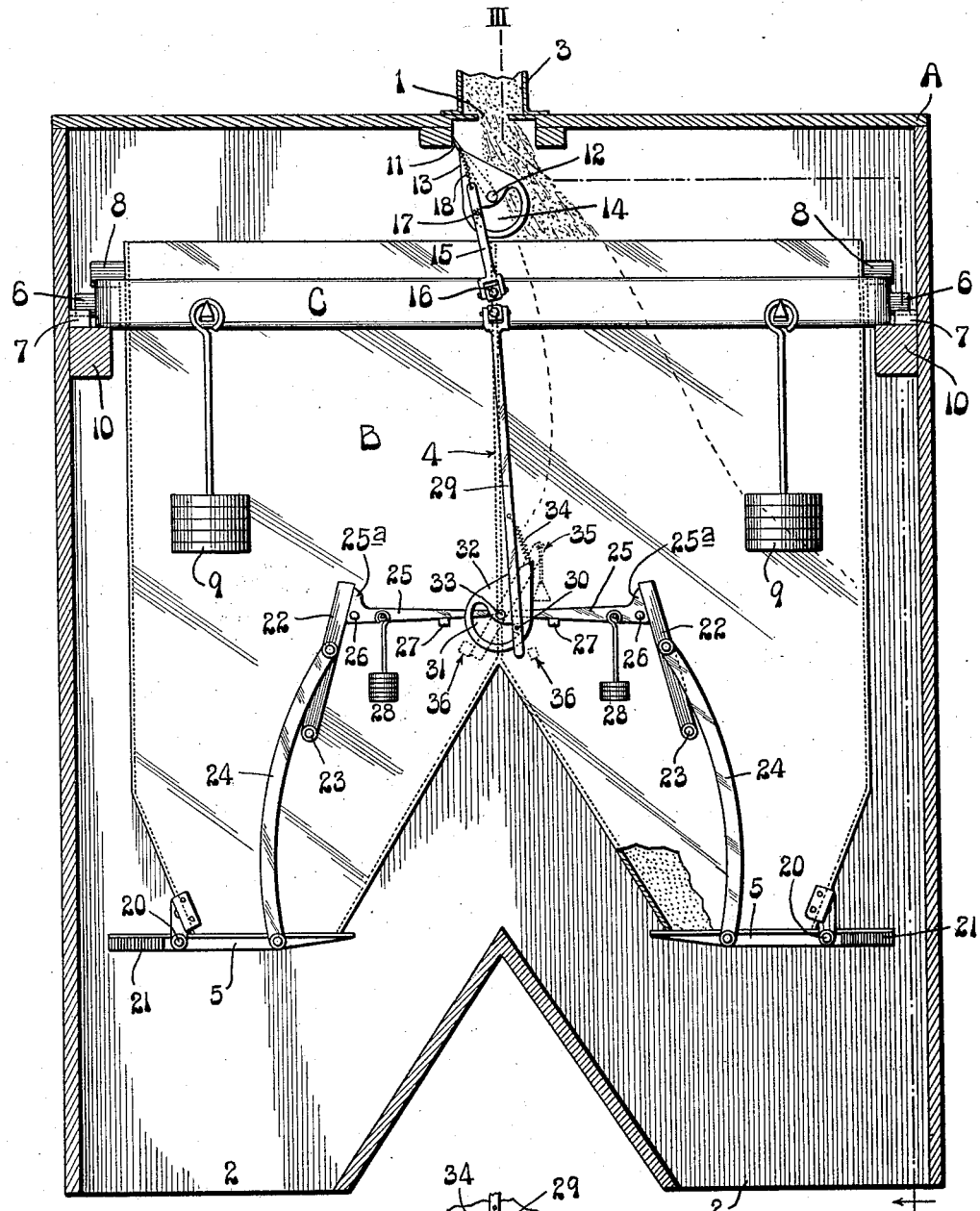

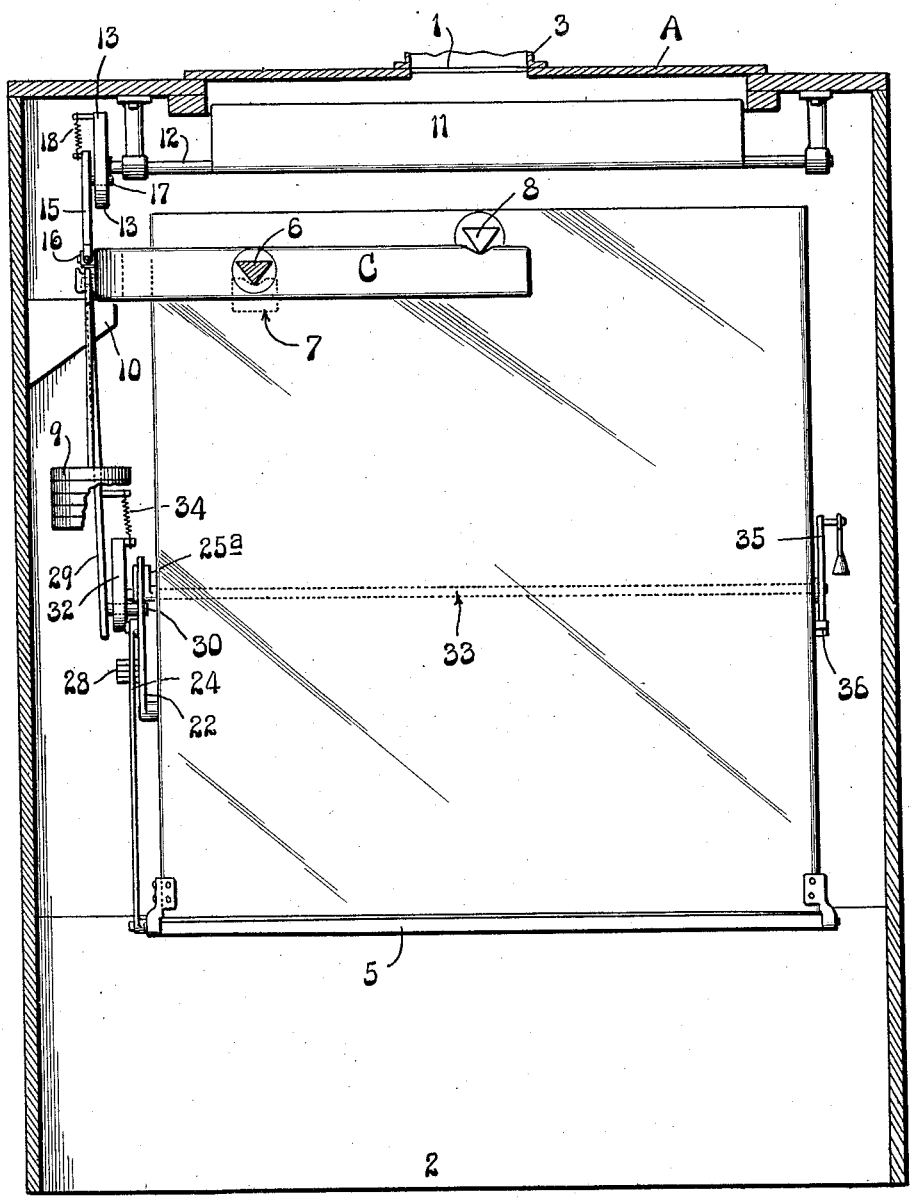

FRANK H. HEADEN, OF EAST ST. LOUIS, ILLINOIS.

AUTOMATIC SCALE.

1,032,209.

Specification of Letters Patent.　　Patented July 9, 1912.

Application filed February 12, 1912. Serial No. 677,043.

*To all whom it may concern:*

Be it known that I, FRANK H. HEADEN, a citizen of the United States of America, residing at East St. Louis, in the county of St. Clair and State of Illinois, have invented certain new and useful Improvements in Automatic Scales, of which the following is a full, clear, and exact description, reference being had to the accompanying drawings, forming a part of this specification.

My invention relates to an automatic scale of the self-dumping type, and has for its object the production of a simple and accurate scale which, while being constantly supplied with material, will automatically discharge predetermined quantities of said material.

In the preferred form of my invention, I preferably utilize a hopper divided into two compartments, each of said compartments having a discharge valve which is normally held in its closed position by suitable locking devices. The material flowing into the hopper is deflected into one of the compartments by an inlet gate adapted to be shifted automatically when a predetermined quantity of material has entered said hopper. The hopper is supported by a scale beam, and certain devices controlled by said scale beam are automatically brought into service when the weight of the hopper and its contents reach a predetermined degree, to release the discharge valve of the compartment containing the material, and at the same time shift the inlet gate to deflect the material into the other compartment.

Figure I is a vertical section through the housing of my improved scale, with the scale shown therein in side elevation. Fig. II is a fragmentary view of a portion of the discharge valve operating mechanism. Fig. III is a vertical section taken approximately on the line III—III, Fig. I.

In the accompanying drawings: A designates a housing provided with an intake opening 1 and discharge openings 2. A delivery pipe 3, at the upper end of the housing may be utilized to conduct material to the apparatus.

B designates a hopper open at the top and divided into two compartments by a partition 4, each of said compartments being provided with a discharge opening which is normally closed by a discharge valve 5. A U-shaped scale beam C, which partially embraces the hopper B, has arms provided with knife edge fulcrum studs 6 resting on bearings 7, fixed to the housing A. The hopper B is provided with knife edge studs 8 which rest on the scale beam.

9 designates weights suspended from the main member of the scale beam to balance the weight of the hopper and its contents. These weights normally hold the scale beam in engagement with stops 10, but when the weights are over balanced by the weight of the hopper contents, the scale beam rocks on its fulcrum studs 6, with the result of operating certain devices to be presently described.

An inlet gate 11, mounted on a rock shaft 12, is arranged below the intake opening 1 for the purpose of deflecting material into either of the hopper compartments. A plate 13, having an aperture 14, is fixed to one end of the inlet gate shaft 12.

15 designates a gate operating arm, pivoted at its lower end to a rockable block 16 on the scale beam C, said gate operating arm being provided with a stud or roller 17 which extends into the aperture 14. The gate operating arm is yieldingly connected to the gate, preferably by means of a spring 18. This spring holds the gate operating arm 15 in the position shown in Fig. I when the gate is positioned to deflect material into the compartment at the right hand side of the partition 4. It should be noted that when the arm 15 is so positioned, its stud 17 lies at the left hand side of the aperture 14. When the scale beam rocks, due to the weight of material in the hopper, the gate operating arm 15 is elevated and its stud 17 strikes the plate 13 at the left hand side of the axis of the gate, thereby moving the gate rightward, with the result of shutting off the right hand compartment and causing the material to flow into the left hand compartment. After the gate has been shifted, the spring 18 tends to pull the valve operating arm 15 rightward and it is permitted to do so when the scale beam returns to normal position. This final movement locates the stud 17 at the right hand side of the aperture 14 in the gate plate 13, and when the scale beam is again operated, said stud will strike the right hand side of the plate 13 to restore the gate to the position shown.

I will now describe the means for locking the discharge valves 5 in their closed positions, and thereafter release them in response to movements of the scale beam.

The discharge valves are hinged to the hopper at 20 and provided with restoration weights 21 for returning them to their closed positions. Lock arms 22 pivoted to the hopper at 23 are connected to the discharge valve 5 by links 24. The lock arms 22 and links 24 are thrown "over center" when the valves are moved to their closed positions by the restoration weights 21, and while said arms and links are located in this position, the valves are locked. Trip levers 25, pivoted to the hopper at 26 and having heels 25$^a$ constitute abutments for limiting the movement of the arms 22. When the discharge valves are closed, these levers 25 provide for the arms 22 and links 24 being normally retained in the positions shown, but said levers 25 may be operated to overthrow the rocker arms 22, thereby releasing the valves. The trip levers 25 are held engaged with stops 27 by adjustable compensating weights 28 having a function which will be hereinafter described.

A tripping device 29 in the form of a pendant is pivoted to the scale beam, and provided at its lower end with a stud 30, which extends through an aperture 31 in a rocker 32. The rocker 32 is fixed to a rock shaft 33 and yieldingly connected to the pendant 29 by a spring 34. The rock shaft 33 oscillates during the operation of the apparatus, and a portion of its movement is caused by a weighted arm 35 fixed to the rear end of said shaft and adapted to alternately engage stops 36. When the parts occupy the position shown, the stud 30 at the lower end of the pendant 29 lies under the lever 25 at the right hand side of the rocker 32. When the scale beam is operated, due to the weight of material in the right hand compartment, the pendant 29 is elevated with the result of lifting the right hand lever 25 to overthrow the lock arm 22 engaged therewith, thereby releasing the discharge valve of the right hand compartment. This allows the material to be discharged from said compartment and the discharge valve is afterward closed by the restoration weight 21. When the pendant 29 is elevated to trip the right hand valve governing means, the rocker 32 is engaged by the stud 30 and shifted to the position seen in Fig. II, and when the scale beam is restored to normal position, the spring 34 pulls the pendant 29 to the position shown in Fig. II. The parts are then positioned to trip the left hand discharge valve upon the next operation of the scale beam.

It will be noted that the valve operating means and the discharge valve releasing devices operate in unison to cause the contents of one compartment to be discharged, and at the same time deflect material into the other compartment.

It has been found in practice that the scale beam will be balanced by a smaller load at one side of the hopper than at the other side thereof and the contents discharged from the two compartments will therefore be unequal unless suitable compensating devices are employed. These compensating devices are required to obtain accuracy because it is almost impossible to fit or adjust the various parts exactly alike on both sides of the apparatus. To compensate for this variable load requirement, I provide the adjustable weights 28, carried by the levers 25, one of which must be lifted during each operation of the scale beam. By varying the weights 28, more or less power will be required to lift the levers 25, and as these levers must be lifted through the medium of the scale beam, the weights may be adjusted to equalize the load required to trip the two sets of discharge valve devices.

I claim:—

1. A scale comprising a hopper divided into compartments, a scale beam supporting said hopper, a gate for deflecting material to any of said compartments, a valve operating member controlled by said scale beam, and a yieldable connection between said gate and gate operating member for shifting the latter after each operation of the valve.

2. A scale comprising a hopper divided into compartments, a scale beam supporting said hopper, a rockable gate supported independently of said hopper for deflecting material to any of said compartments, and a gate operating member pivotally connected to the scale beam.

3. A scale comprising a hopper divided into compartments, a discharge valve for each of said compartments, a scale beam supporting said hopper, means for holding said discharge valves in their closed positions, means, controlled by the scale beam, for alternately releasing said valves, a rockable gate above said compartments for deflecting material to either compartment, a gate operating member controlled by the scale beam, and a yieldable connection between said gate and said gate operating member.

4. A scale comprising a hopper, a scale beam supporting said hopper, discharge valves, means for holding said discharge valves in their closed positions, a tripping device operable by the scale beam to release said holding means, a rocker operable by said tripping device, and a yieldable connection between said rocker and tripping device.

5. A scale comprising a hopper, a scale beam supporting said hopper, discharge valves, two sets of devices for holding said discharge valves in their closed positions, a tripping device operable by the scale beam to release either of said sets of valve holding devices, a rocker operable by said tripping device, and a yieldable connection between said rocker and tripping device for shifting the latter from one of said holding devices to the other valve holding device.

6. A scale comprising a hopper, a scale beam supporting said hopper, discharge valves, means for holding each of said valves in its closed position, means operable in unison with the scale beam for releasing either of said valves, the last named means comprising a pendant adapted to release the holding means of either valve, a rocker operable by said pendant, and a yieldable connection between said rocker and pendant for shifting the pendant, after it has released one of the valves, to a position where it may operate to release the other valve.

7. A scale comprising a hopper, a scale beam supporting said hopper, discharge valves, means for holding said valves in their closed positions, said means comprising levers operable to release the valves, and adjustable compensating weights carried by said levers; and means for operating said levers in unison with operation of the scale beam.

8. A scale comprising a hopper, a scale beam supporting said hopper, discharge valves, means for holding said valves in their closed positions, said means comprising levers operable to release the valves, and adjustable compensating weights carried by said levers, a tripping device carried by the scale beam and adapted to lift said levers, and means for shifting said tripping device from one lever to the other after it has lifted either of said levers.

FRANK H. HEADEN.

In the presence of—
A. J. McCAULEY,
E. B. LINN.

Copies of this patent may be obtained for five cents each, by addressing the "Commissioner of Patents, Washington, D. C."